Figure 1:
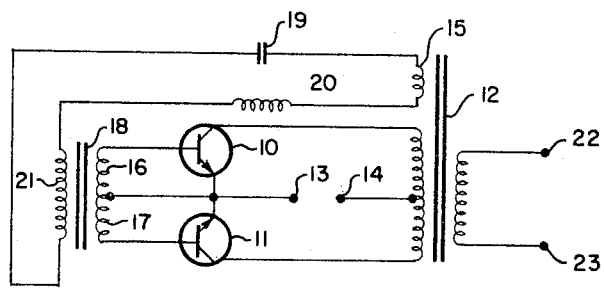

Aug. 23, 1966  E. J. MILLER ET AL  3,268,833
INVERTER WITH TUNED CIRCUIT FREQUENCY CONTROL
Filed Aug. 15, 1961  2 Sheets-Sheet 1

INVENTORS
EDWARD J. MILLER
JAMES H. SYHRE
BY

*Earl C. Hancock*

AGENT

United States Patent Office 3,268,833
Patented August 23, 1966

3,268,833
INVERTER WITH TUNED CIRCUIT FREQUENCY CONTROL
Edward J. Miller and James H. Syhre, Littleton, Colo., assignors to Martin-Marietta Corporation, a corporation of Maryland
Filed Aug. 15, 1961, Ser. No. 131,511
8 Claims. (Cl. 331—113)

This invention relates to electrical inverter circuits of the self-excited type. More particularly, this invention relates to inverter circuits employing tuned resonant circuits for controlling the frequency of oscillation thereof independently of variations in the inverter parameters or voltages.

An inverter circuit is utilized for producing an alternating output usually having a substantially squarewave configuration from a direct current input. One of the earliest such inverters is the mechanical vibrator typically employed in automobile radios. Another inverter frequently employed in the past is the rotating inverter which is basically an A.C. generator that is driven by a D.C. motor. However, both of these inverters depended upon mechanical parts which are often unreliable, bulky and unstable.

Accordingly, the electronics industry has made many efforts to escape the limitations of the mechanical devices by designing circuits to perform the inverter operation or conversion with electronic components having no moving parts.

Some of the relatively recent approaches to static inverter design have been developed from the general principles similar to those underlying the now well-known multivibrator. Inverter circuits using the multivibrator principles generally employ a pair of unidirectional current conducting devices such as transistors and vacuum tubes connected in the output stage in a push-pull arrangement. By push-pull it is meant that the output signals from the devices are coupled to a common output mixer such as a transformer so that one device can cause current flow in the mixer in one direction while the other device can cause current flow in the mixer in the opposite direction. Then by alternately and sequentially turning the devices on and off, each device can amplify one half of a cycle thereby utilizing the maximum amplification of the two devices. Thus the key to the operation of an inverter utilizing a push-pull arrangement for the output stage is in the manner of turning the devices on and off.

One suggested solution to the on-off operation is to provide a circuit means for feeding a portion of the output signal back into each of the output transistors or vacuum tubes. When one of the devices starts to conduct, the feedback is arranged to drive that device into saturated current conduction. Then when the output transformer saturates, the feedback will drop causing the output current to drop thereby driving the device into the non-conducting or cut-off state. The other device is coupled to the feedback so as to be cut-off as the first device is beginning to conduct and conversely to conduct when the first device is cut off. This arrangement closely resembles a free-running multivibrator but has a marked disadvantage in that it is dependent upon the saturation characteristics of the output transformer, and these characteristics tend to shift with temperature and age of the transformer thereby causing the frequency of the output signal to vary. In addition, the time of saturation of the transformer which controls the output frequency is sensitive to variations in the voltage applied across the transformer. Therefore, this transformer saturation dependent circuit tends to be unreliable if the load to be coupled to the inverter requires relatively close tolerances on the output frequency.

As a result, efforts have been made to provide the on-off switching or transition of the push-pull devices before the output transformer saturates. One suggested way of accomplishing this transition is to simply introduce pulses into the control elements of the push-pull devices from an external pulse generator. This solution requires additional circuitry, however, which must supply the triggers with enough amplitude to ensure transition. If the voltage from the power supply to the trigger circuitry drops for any reason, the frequency of the trigger might shift or the amplitude of the trigger might drop below the switching level causing the transition to cease.

Another suggested solution is to feed back a portion of the output signal to the control elements of the push-pull device through another transformer that saturates before the output transformer. This has the advantage that very little power is passed through this feedback transformer and it is accordingly less prone to vary with temperature. However, this arrangement still depends upon the feedback transformer characteristics remaining relatively constant which unfortunately is not always the case. Further this circuit is subject to frequency shifts if the ambient temperature of the atmosphere surrounding the feedback transformer is varied. Circuits employing the saturated feedback transformer and the external trigger arrangement are more fully described in two articles entitled "Design Techniques of Static Inverters" by Albert A. Sorensen in the Jan.-Feb. 1960 issue of the Electrical Manufacturing magazine.

It has even been suggested that a tuned circuit be employed as a resonant filter to couple a portion of the output of the push-pull devices back into the feedback transformer. The resonant frequency of the tuned circuit can be set to cause transition to occur before the feedback transformer reaches saturation. However, the tuned circuit controlled inverter circuits known at the time of this invention were all sensitive to load variations which are directly reflected into the tuned circuit thereby causing the resonant frequency of the tuned circuit to shift and become unstable.

Accordingly, the present invention provides a self-contained inverter circuit capable of producing a highly stable and reliable output voltage despite variations in the magnitude of the load applied thereto and despite variations of the input voltage. More particularly, the present invention advantageously utilizes a pair of unidirectional current conduction devices connected in a push-pull arrangement for producing output power with the transition of these devices being controlled by a tuned circuit that is substantially isolated from and relatively unaffected by variations of the load and/or variations of the voltage of the power source. Positive feedback is employed to provide the driving power for transition but the transition is triggered by the output of the isolated tuned circuit at its resonant frequency.

In one embodiment of this invention, at least one feedback winding is electromagnetically coupled to the output transformer of a push-pull type inverter in a step-down arrangement with respect to the secondary winding of the output transformer. A tuned circuit is then connected in series with the feedback winding and with the primary of another transformer, the latter transformer being coupled to the control circuits of the push-pull devices. The resonant frequency of the tuned circuit is set to cause transition of the push-pull device before saturation of either of the transformers.

In another embodiment of this invention, a pair of feedback windings are each electromagnetically coupled to the output transformer of a push-pull type inverter. The turns ratio is designed to provide a step-down relation from the secondary winding of the output transformer to either of the feedback windings. The feedback windings are each connected on one side to a respective end of the primary winding of a second transformer and on the other side to a control element of a respective one of the push-pull devices. A series resonant circuit is connected across the secondary winding of the second transformer. The resonant circuit is excited by the voltages fed back by the feedback windings and introduces a signal into the circuits of the control elements of the push-pull devices so as to cause transition to occur before saturation of either of the transformers. In both of the aforementioned embodiments, the tuned circuit is substantially isolated from load variations, from power source variations and from the push-pull devices.

The present invention can be readily adapted to include means for ensuring initial oscillation of the resonant circuit. The circuit can also be easily adapted to provide means for improving the rise and fall time of the square-wave output.

Figure 2:
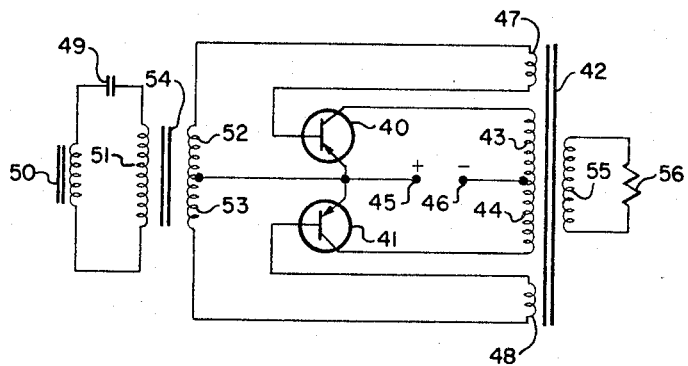
Figure 3:
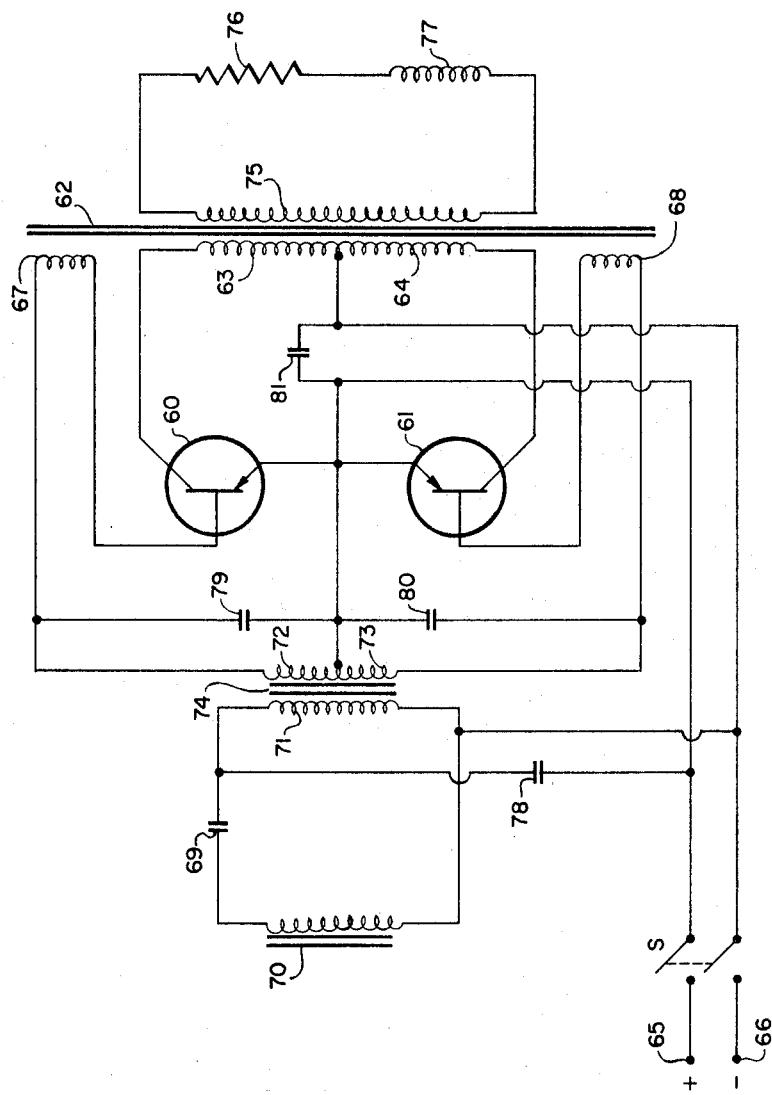

The novel features that are considered characteristic of this invention are set forth with particularity in the appended claims. The invention, however, both as to its organization and method of operation as well as additional features and advantages thereof will be best understood from the following description when read in connection with the accompanying drawings in which:

FIGURE 1 illustrates one embodiment of the present invention employing a single feedback channel, and FIGURE 2 illustrates another embodiment of the present invention employing dual feedback channels, and FIGURE 3 is a circuit similar to FIGURE 2 with some additional features included therein.

FIGURE 1 shows a relatively simple form of the present invention with transistors 10 and 11 being shown as transistors for purposes of illustration only. Transistors 10 and 11 are connected in a push-pull arrangement through the center-tapped primary winding of transformer 12. A power source is connected between terminals 13 and 14 for the purpose of supplying emitter-collector current for transistors 10 and 11. The base circuits of transistors 10 and 11 include windings 16 and 17 respectively which are really each one half of the center-tapped secondary winding of transformer 18. Feedback winding 15 is electromagnetically coupled to the primary winding of output transformer 12. A series resonant circuit herein illustrated as capacitor 19 and inductor 20 couple feedback winding 15 to the primary winding 21 of transformer 18. The load for the circuit (not shown) would be connected across the secondary of output transformer 12 at the output terminals 22 and 23.

Assume that power has been applied to terminals 13 and 14 and that transistor 10 is initially conducting while transistor 11 is initially non-conducting. A voltage will build up across the upper half of the center-tapped primary winding of transformer 12 and thus will be coupled to feedback winding 15 and to terminals 22 and 23 via the secondary winding. Capacitor 19 and inductor 20 will then be excited into ringing or oscillation thereby producing alternating signals that will be coupled to the base circuits of transistors 10 and 11 by means of transformer 18. These signals will cause transistor 10 to cut off and at the same time will cause transistor 11 to begin conducting. Thus the resonant circuit will cause transistors 10 and 11 to sequentially and alternately turn on and off producing an alternating output at terminals 22 and 23 while maintaining an excitation voltage at feedback winding 15 for the ringing resonant circuit.

FIGURE 2 shows another embodiment of this invention with some additional features as compared with FIGURE 1. In FIGURE 2, the collectors of transistors 40 and 41 are connected to sections 43 and 44 respectively which are each half of the center-tapped primary winding of output transformer 42. The collector-emitter circuits of transistors 40 and 41 are completed by attaching a power source to terminals 45 and 46. Although a particular polarity of the power source is shown for terminals 45 and 46, this is solely because transistors 40 and 41 are illustrated as PNP transistors, but the invention is not so limited, of course. In fact, vacuum tubes could be used instead of transistors and still be within the spirit of this invention.

The base circuit of transistor 40 is completed by feedback winding 47 and section 52 of the center-tapped primary winding of isolation transformer 54. Feedback winding 47 is arranged to provide positive feedback to transistor 40 whenever transistor 40 is conducting so as to introduce collector current to section 43 of output transformer 42. That is, whenever transistor 40 starts to conduct, feedback winding 47 will introduce a signal into the base circuit of transistor 40 so as to drive this transistor further into conduction. This regenerative process will continue in a cumulative manner until the base and collector currents of transistor 40 reach the saturation level. Thereafter, any reduction in base current below the saturation level of transistor 40 will cause a signal to be introduced tending to effect a corresponding reduction in the collector current. Feedback winding 47 will couple the collector current reduction into the base of transistor 40 which will thus be driven further in the reduced conduction direction. This process will ultimately drive transistor 40 into cut-off. A similar operation is performed by transistor 41 with its associated windings 44, 48 and 53, of course. The foregoing explanation was based upon the assumption that transistors 40 and 41 will be operated in the saturated conduction state. However, it should be readily apparent that a circuit could be constructed within the spirit of this invention wherein maximum current conduction of the transistors would be below saturation.

It should be noted that the signal fed back from feedback winding 47 for driving transistor 40 further into conduction will also be coupled into feedback winding 48 and section 53 of transformer 54 in such a direction as to hold transistor 41 in the non-conducting state. The converse is true when transistor 41 is conducting.

A series resonant circuit including capacitor 49 and inductor 50 is connected to the secondary 51 of isolation transformer 54 so that the voltage appearing at windings 52 and 53 will be electromagnetically coupled to excite the resonant circuit into a ringing state. The resonant frequency of this circuit is then set to reintroduce signals back into windings 52 and 53 to cause sequential and alternate transition of transistors 40 and 41 before either output transformer 42 or isolation transformer 54 are allowed to saturate. That is to say, the resonant tuned circuit will introduce a slight signal in the cut-off direction to the conducting transistor and thus will start this transistor into the non-conduction direction. The amplification inherent in the transistor and the positive regeneration via transformer 42 will then take over to complete the transition as described hereinbefore. If the transistors are operated in saturation, the signal from the resonant circuit that appears at the base of the transistor must have sufficient magnitude to drive the transistor just below saturation.

The turns ratio from secondary winding 55 to either of feedback windings 47 and 48 is maintained in a step-down relation so that any variations of load 56 will not be reflected into the resonant circuit thereby providing the isolation feature.

From the foregoing it can be seen that the damped natural frequency of the tuned circuit depends almost entirely on the values of the inductor 50 and capacitor 49 and to a small extent upon the inductance and resistance present at the primary of isolation transformer 54. However, the impedance of the base circuits of the transistors appear to be practically constant to the tuned circuit. Any irregular or undesirable variations which might occur therein are those reflected from variations in load 56. But by the time the reflected load variations are mixed with the relatively constant base circuit impedance and reflected into the resonant circuit, the effect of such load variations upon the tuned circuit is negligible. Therefore, the damped resonant frequency, $f$, of the tuned circuit can be established for practical purposes from the equation:

$$f = \frac{1}{2\pi}\sqrt{\frac{1}{LC} - \frac{R^2}{4L^2}}$$

Where L is the value of inductor 50, C is the value of capacitor 49, and R is whatever resistance is present in the tuned circuit. Since the tuned circuit is controlling the transition of the transistors as they operate in the push-pull switching mode, the output voltage will be a square wave recurring at the same frequency as the tuned circuit despite fluctuations of the load. Further the equation for the damped resonant frequency, $f$, is independent of the power source voltage and accordingly is independent of source voltage variations.

FIGURE 3 is similar in structure to the circuit shown in FIGURE 2 but includes some additional features that can be included therewith. A detailed discussion of the components that have similar functions in FIGURE 2 will be omitted for FIGURE 3.

In FIGURE 3, the power source is connected to terminals 65 and 66. When switch S is closed, an initial pulse is coupled to the tuned circuit by means of capacitor 78, this initiating pulse exciting the resonant circuit into ringing and possibly even triggering one of the push-pull transistors into conduction. The invention is not limited to the use of a capacitor as an initiator or starter, of course, and many arrangements will be obvious to those having normal skill in the art. Capacitors 79 and 80 can be included to shorten the rise and fall time of the output squarewave by providing a low impedance path for the high frequency components of the squarewave being fed back by means of feedback windings 67 and 68. Inductor 77 is included in the load circuit only to illustrate that such loads are frequently inductive. It could have been omitted entirely, of course, or a capacitor could have been included in its place.

Capacitor 81 can also be included to help reduce voltage transients on the leading edges of the output waveforms. Additionally, capacitor 81 would filter out RF interference that might be generated either externally or internally to the circuit and further would protect the transistors from power surges generated externally to the inverter.

A circuit actually built and successfully operated in accordance with FIGURE 2 used the following parameters:

| Component: | Value or type |
|---|---|
| 40, 41 | 2N575A (Minneapolis-Honeywell). |
| 49 | 1 microfarad. |
| 50 | 38 milli-henries. |
| 43, 44 | 50 turns each. |
| 47, 48 | 5 turns each. |
| 52, 53 | 63 turns each. |
| 51 | 315 turns. |

The inductor 50 that was used in the circuit had an AL-12 "C" core with a 0.008 inch air gap. Two 20 ohm resistors were connected across windings 52 and 53 respectively for substantially the same reason as capacitors 79 and 80 in FIGURE 3. A ¼ ohm resistor was included in series between the base of each transistor and the feedback winding associated therewith to provide current limiting and prevent operation beyond the transistor ratings. A 28 volt D.C. power supply was used and the resonant frequency was 800 c.p.s. which was also the output frequency. Variations of the load from half load to 50% overload resulted in frequency variations of approximately 0.5% or less which is an unusual frequency stability for a static inverter.

Another circuit actually constructed along the lines of FIGURE 3 employed components of similar values as those mentioned for FIGURE 2. However, capacitors 79 and 80 were in fact capacitors of one microfarad in value each and not resistors. This produced rise times as low as three microseconds. In addition, capacitor 81 was one hundred microfarads and capacitor 78 was 0.005 microfarad. It was found that the resistance of the resonant circuit was approximately three ohms. The test results for the circuit built in accordance with FIGURE 3 were substantially the same as the test results for the FIGURE 2 configuration.

The circuits embodying the present invention are generally self-starting. Therefore, the initiator structure such as capacitor 78 can be omitted entirely in many cases. Occasionally it might be desirable to include the initiator elements although this is not usually necessary unless a heavy initial load is connected to the inverter.

Although the foregoing exemplary embodiments have been described with particularity, the present invention is not intended to be limited to the particular embodiments and uses shown and described. For instance, this invention could be readily adopted for D.C. to D.C. conversion. In addition, an external synchronous signal could be applied to the resonant circuit for even greater stability if this should be desired. The introduction of such a synchronous signal could be accomplished by making the inductor of the tuned circuit the secondary winding of a transformer connected for coupling synchronous signals or by capacitive coupling into the tuned circuit or any of a number of available means. Many other variations within the spirit of this invention will be readily apparent to those having normal skill in the art.

What we claim is:

1. A static inverter circuit comprising at least one pair of substantially unidirectional current conducting devices each having at least one element for selectively controlling the magnitude of the current flow through the said device associated therewith, an output transformer having a center-tapped primary winding, a secondary winding and a feedback winding, circuit means for energizing said primary winding between one end and the center-tap thereof with current from one of said devices while energizing said primary transformer between the other end and the center-tap thereof with current from the other of said devices, an isolation transformer having a primary winding and a center-tapped secondary winding; a series resonant circuit coupled to be excited by voltages appearing at said feedback winding and to introduce energizing current to said primary winding of said isolation transformer, means for coupling the ends of said center-tapped secondary winding to a respective said control element on said devices thereby alternately introducing conduction and non-conduction signals to said devices at the resonant frequency of said resonant circuit, and load means connected to said secondary winding of said output transformer, the turns ratio on said output transformer between said secondary winding and said feedback winding thereof allowing the resonant frequency of said resonant circuit to be independent of variations of said load.

2. A static inverter circuit comprising at least one pair of substantially unidirectional current conducting devices each having at least one element for selectively controlling the magnitude of the current flow through the said device associated therewith, an output transformer having a center-tapped primary winding, a secondary winding and a pair of feedback windings; the outputs of said devices being connected to a respective end of said primary winding of said output transformer in a push-pull arrangement, means for supplying operating power to said devices, an isolation transformer having a center-tapped primary winding and a secondary winding, a series resonant circuit connected to said secondary winding of said isolation transformer, the inputs of said devices being commonly connected to the center-tap of said primary winding of said isolation transformer, the ends of said isolation transformer primary winding being connected to a respective one of said feedback windings, said feedback windings being arranged for providing positive feedback to the said control element of a respective one of said devices and for introducing excitation voltages to said series resonant circuit, and a load means connected to said secondary winding of said output transformer, the turns ratio between said output transformer secondary winding and said feedback windings providing substantial independence of the resonant frequency of said series resonant circuit with respect to variations of the impedance of said load means.

3. Apparatus in accordance with claim 2 which includes means for A.C.-coupling an initiating excitation pulse to said series resonant circuit.

4. A static inverter circuit comprising first and second transistors each having at least a base electrode, and emitter electrode and a collector electrode, an output transformer having a center-tapped primary winding, a secondary winding and first and second feedback windings; the said collector electrodes of said transistors being coupled to a respective end of said output transformer primary winding, a power source commonly connected on one side thereof to said emitter electrodes of said transistors and connected on the other side to the center-tap of said output transformer primary winding for completing the power circuit of said transistors in a push-pull arrangement, in isolation transformer having a center-tapped primary winding and a secondary winding, the center-tap of said isolation transformer primary winding being commonly connected to the said emitter electrodes of said transistors, said first feedback winding being connected between said base electrode of said second transistor and the other end of said isolation transformer primary winding, said feedback windings each being arranged with respect to said primary windings for providing positive feedback during conduction of the said transistor coupled thereto while driving said transistor further into nonconduction during conduction of the other said transistor, a series resonant circuit connected across said isolation transformer secondary winding so as to be excited by signals introduced to said isolation transformers by said feedback windings, said series resonant circuit coupling transition signals at the resonant frequency thereof into the base circuits of said transistors for providing transition of conduction between said transistors before saturation is reached by said transformers, and a load connected across said secondary winding of said output transformer, the turns ratios between said output transformer secondary winding and said feedback windings being designed to prevent variations of said load from effecting the resonant frequency of said series resonant circuit.

5. A static inverter circuit in accordance with claim 4 which includes means for introducing a signal into said resonant circuit to initiate ringing thereof.

6. A static inverter circuit in accordance with claim 4 which includes capacitive coupling between said power source and said resonant circuit for introducing an initial excitation voltage to said series resonant circuit whenever said power source is initially connected to said inverter thereby ensuring oscillation of said inverter.

7. A static inverter circuit in accordance with claim 4 which includes means for introducing synchronizing signals into said resonant circuit.

8. A static inverter circuit comprising: at least one pair of substantially unidirectional current conducting devices each having at least one element for controlling the magnitude of the current flow through it; an output transformer having primary and secondary windings; circuit means for alternately energizing said primary winding of said output transformer with current in a first direction from one of said devices and with current in the opposite direction from the other of said devices; load means connected to said secondary winding of said output transformer; a resonant circuit; means for electromagnetically coupling excitation current from said primary winding of said output transformer into said resonant circuit, said coupling means comprising at least one winding on said output transformer, with the number of turns on both said coupling means winding and the secondary winding of said output transformer providing a voltage step-down for preventing the reflection of load variations into said resonant circuit; and means for coupling the signals generated by said resonant circuit to said control elements of said devices for alternately controlling the current conduction and nonconduction of said devices whereby the voltage appearing at said load means will recur at the same frequency as the resonant frequency of said resonant circuit.

References Cited by the Examiner
UNITED STATES PATENTS

| | | | |
|---|---|---|---|
| 2,922,958 | 1/1960 | Dean | 321—2 X |
| 2,962,667 | 11/1960 | Relation et al. | 331—114 |
| 2,965,856 | 12/1960 | Roesel | 331—113 |
| 2,971,126 | 2/1961 | Schultz | 331—113.1 X |
| 2,971,166 | 2/1961 | Schultz | 321—2 X |
| 3,051,914 | 8/1962 | Brown | 331—113.1 |
| 3,119,972 | 1/1964 | Fischman | 331—117 |

OTHER REFERENCES

Electronic and Radio Engineer, March 1959, "High Power Transistor D.C. Converters," Pye, pp. 96–105.

JOHN F. COUCH, *Primary Examiner.*

ROBERT C. SIMS, GEORGE A. BUDOCK, LLOYD McCOLLUM, *Examiners.*

A. J. GAJARSA, G. GOLDBERG, *Assistant Examiners.*